March 21, 1933. C. R. JOHNSON 1,902,558
APPARATUS FOR AND METHOD OF LOCALIZING AND MEASURING BY X-RAY
Filed Sept. 29, 1928 2 Sheets-Sheet 1
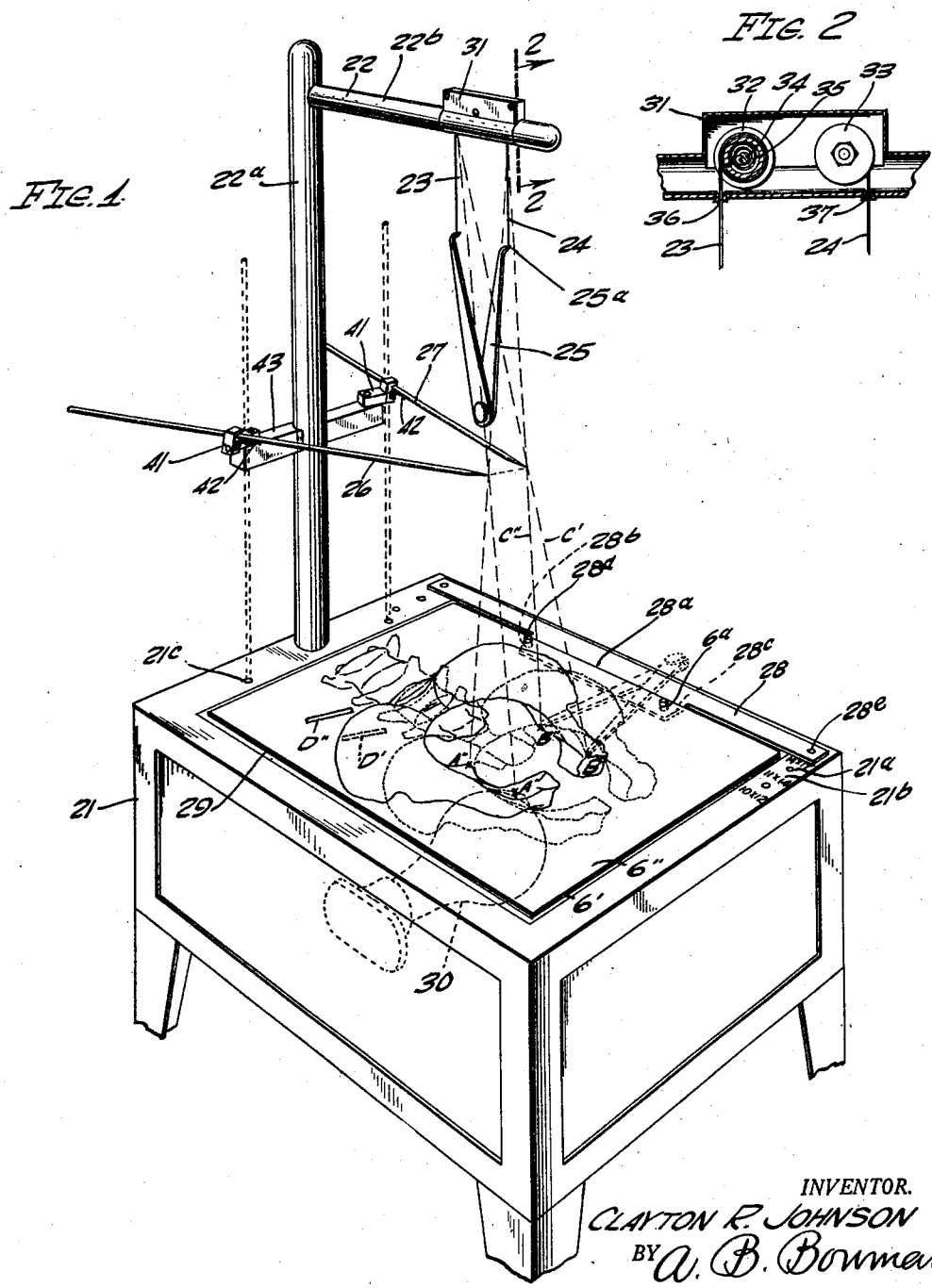
INVENTOR.
CLAYTON R. JOHNSON
BY A. B. Bowman
ATTORNEY

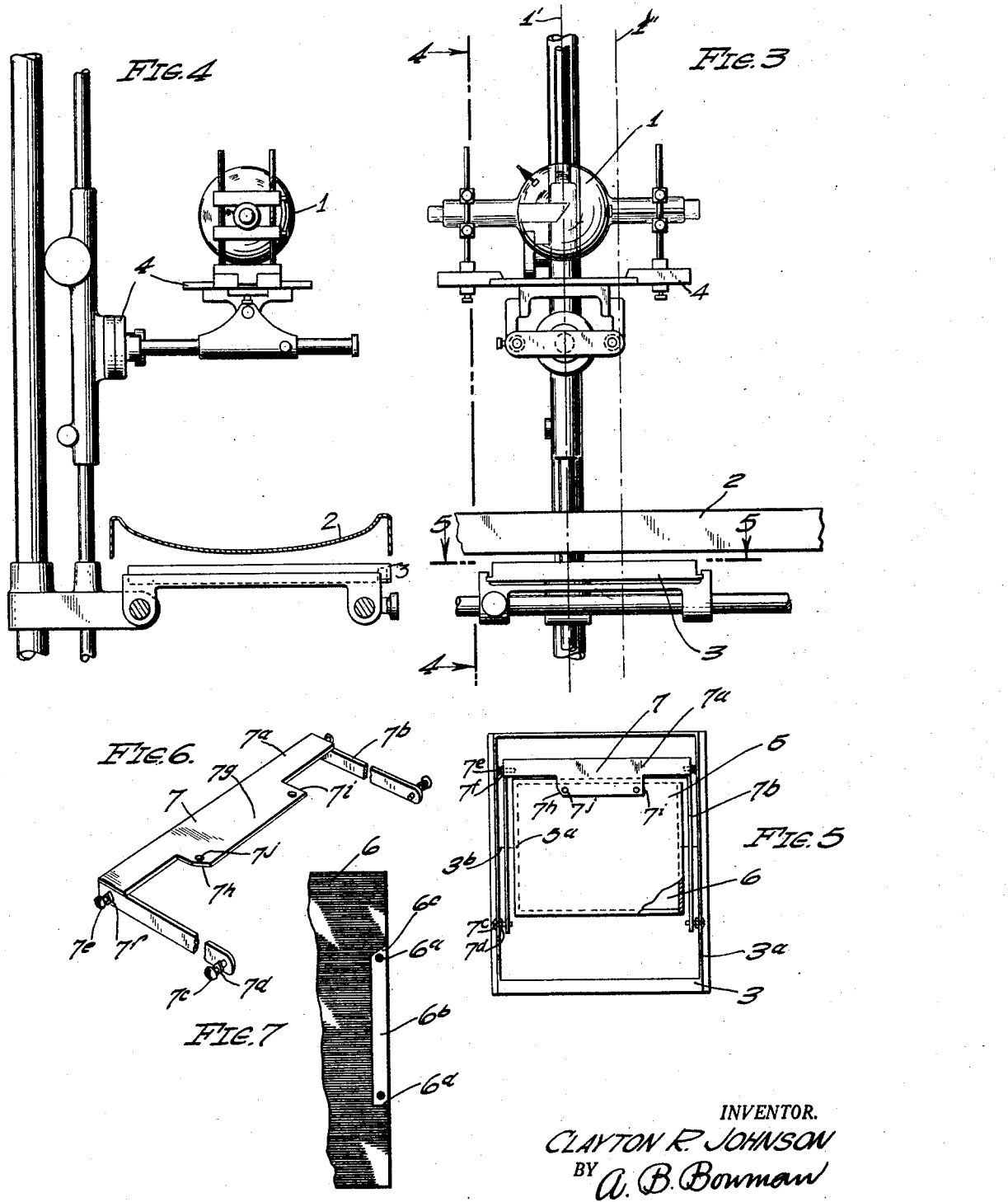

Patented Mar. 21, 1933

1,902,558

UNITED STATES PATENT OFFICE

CLAYTON R. JOHNSON, OF LOS ANGELES, CALIFORNIA

APPARATUS FOR AND METHOD OF LOCALIZING AND MEASURING BY X-RAY

Application filed September 29, 1928. Serial No. 309,197.

My invention relates to apparatus for and method of localizing and measuring by X-ray.

The objects of my present invention are: first, to provide apparatus of this class whereby points and objects in the human body, and the like, may be localized accurately, quickly and easily, and whereby such objects, and distances of such objects from fixed portions of the body, and other distances between various portions of the human body, and the like, may be accurately, easily and quickly measured; second, to provide apparatus of this class whereby several radiographs may be made from the same subject from different positions or angles relative thereto, and whereby the radiographs may be accurately marked so that the same may be accurately superimposed or otherwise associated and placed for reproducing the positions of the shadows of the object of the subject or other portions of the subject relative to the subject and the source of the X-rays or the focus of the X-ray tube; third, to provide novel means and method of marking radiographs; fourth, to provide novel adjustable marking means in connection with X-ray tubes for marking radiographs of different sizes, and also novel means in connection therewith for positioning the films or plates from which the radiographs are made; fifth, to provide radiographs having novel and various markings whereby the same may be accurately superimposed or otherwise placed relative to each other, and whereby the error of superimposition and of localizing and measuring thereby is reduced to a minimum; sixth, to provide novel apparatus for reproducing accurately and visually the conditions and positions of the focal point of the X-ray tube in various positions relative to the radiographs produced of the subject from the different positions of the focus of the X-ray tube, and for producing visually or mechanically the directions of the X-rays from the various positions of the X-ray tube relative to the radiographs, thus visually reproducing several rays through the same object or point in the subject and thereby visually locating such point or object relative to the radiograph and permitting the measurement of the distance between any two of such points or objects; seventh, to provide novel means, in connection with such visual or mechanical X-ray reproducing apparatus, for accurately positioning radiographs thereon or relative thereto, and for accurately positioning radiographs of different sizes relative thereto or thereon; eighth, to provide a novel adjustable radiograph marker adapted for different size radiographs and also different size X-ray machines, and such a marker which is also shiftably mounted so that the same will seat itself immediately upon the radiograph holding the cassette so as to produce sharp images of the marker thereon; ninth, to provide novel means and method of checking the accuracy of the calculations or results; tenth, to provide such markings for radiographs whereby a pair of radiographs from the same subject, but taken from different positions may be readily alined and corresponding points accurately marked thereon; eleventh, to provide a novelly constructed mechanical X-ray reproducing apparatus; twelfth, to provide as a whole a novel apparatus for and a novel method of localizing and measuring by X-ray; thirteenth, to provide apparatus of this class which is simple and economical of construction, efficient, easy to operate, which will not readily deteriorate or get out of order, and which may be used in connection with the various X-ray apparatus now in use; and, fourteenth, to provide a novel method of marking radiographs for the purpose mentioned.

With these and other objects in view, as will appear hereinafter, my invention consists of certain novel features of construction, combination and arrangement of parts and portions of my apparatus, and of certain novel steps in carrying out my method, as will be hereinafter described in detail and particularly set forth in the appended claims, reference being had to the accompanying drawings and to the characters of reference thereon, which illustrate one form of my apparatus, and in which:

Figure 1 is a fragmentary perspective view of the X-ray reproducing portion of my present invention, certain parts and portions thereof being shown by dotted lines in various shifted positions; Fig. 2 is an enlarged fragmentary sectional view thereof on an enlarged scale showing one form of mounting the wires adapted for visually reproducing the X-rays or the direction thereof to the points or objects in space or in the subject of the radiograph; Fig. 3 is a fragmentary front elevational view on a reduced scale of an X-ray machine in one form; Fig. 4 is a sectional elevational view thereof taken at 4—4 of Fig. 3; Fig. 5 is a plan view of the cassette holding tray and the cassette positioned therein and the marking means in connection with the tray, showing certain parts and portions broken away and in section to facilitate the illustration; Fig. 6 is a perspective view on an enlarged scale showing the adjustable marking means in the cassette holding tray; and Fig. 7 is an enlarged fragmentary view of a radiograph showing the markings at the one edge thereof produced by the marking means and the X-rays.

Like characters of reference refer to similar parts and portions throughout the several views of the drawings.

The X-ray machine shown in Figs. 3 and 4 is a diagrammatic representation of a common type of X-ray machine now in use. This machine consists primarily of an X-ray tube 1, a table 2 positioned below the X-Ray tube, and a tray 3 positioned below the table 2 for supporting a photographic film or plate. For carrying out my invention, it is necessary that the X-ray tube be shiftable laterally with respect to the table and the tray, or that both the table and tray are shiftable laterally with respect to the X-ray tube. In this instance, the tube is supported on suitable framework 4 for adjusting the same relative to the tray 3 and also for shifting the same to different lateral positions relative to the tray.

In the tray 3 is removably positioned the conventional cassette 5 for holding and enclosing the photographic film or plate 6. In the tray, I have provided an adjustable marking member 7, which consists in this instance of a long flat bar 7a rigidly secured at its ends to the free ends of a pair of positioning arms 7b which are adapted to be variously pivotally supported at the opposite sides of the tray. The bar 7a extends transversely with respect to the tray and longitudinally with respect to the lateral shift of the X-ray tube, the shift and the two principal positions of the focal axis of the X-ray tube being represented by the solid line 1' and the dotted line 1'' in Fig. 3.

The opposite sides of the tray consist of thin walls which are provided with spaced notches 3a which extend inwardly from the upper edges. These notches serve as positioning means for the member 7 for marking films or plates of different sizes. The arms 7b are provided at the ends opposite the bar 7a with screws 7c extending inwardly from the outer sides of the arms. On these screws are nuts 7d between which and the heads of the screws the sides of the tray are clamped, the screws at the portions between the heads and nuts being positioned in said notches. Thus the screws serve at once as securing means, as pivot means, and as means for adjusting the marking member to trays of slightly varying widths. In or near the ends of the arms 7b to which the bar is secured, are other outwardly extending screws 7e for adjusting said end to the inside of the tray to prevent material endwise shifting of the bar, the screws 7e being locked into position by nuts 7f. It will be noted that the bar end of the member 7 is permitted free movement upwardly and downwardly so that the same will rest freely but tightly against the top of the cassette. The several spaced notches are preferably designated with different indicia to designate the position of the member 7 for marking the films or plates of different sizes used. At the front side or edge of the marking member 7, is provided an extended marking plate portion 7g which is adapted to extend over the top side of the cassette near the inner edge, and also over the edge portion of the film or plate positioned within the cassette. The ends of the marking plate portion is preferably of different design, the one end being angular, as indicated by 7h, and the other being square, as indicated by 7i, so that when the film or plate is subjected to the X-rays, a longitudinal shadow with ends of different outline will be cast thereby on the film or plate and thus produce different markings thereon at the edge, as shown in Fig. 7. Each end of the marking plate portion is provided with transverse holes 7j through which the X-rays may pass for causing circular impressions or markings 6a within the blank marking 6b caused by the portion 7g, the ends of the blank marking being designated 6c and 6d, the markings 6a being dark. The purpose of the markings 6a is for designating the place of perforation in case a film is used, the perforations being adapted to receive conforming pins for positioning the film fixedly on the X-ray reproducing apparatus to be described hereafter.

It will be here noted that the photographic film or plate is positioned transversely with respect to the focal axis of the X-ray tube and preferably in such relation thereto that the focal axis of the X-ray tube intersects the plane of the film or plate at equal distances from its central portion before and after the X-ray tube is shifted relative to the film or the cassette.

The cassette is provided intermediate the ends of its opposite lateral edges of its top side with an index hair line 5a which is adapted to aline with a corresponding line 3b on the bottom of the tray for positioning the cassette approximately centrally within the tray.

It will be here also noted that although provision is made for positioning the film in a particular position within the tray, it is wholly immaterial whether the same be aligned therein or not as long as a suitable impression is produced on the film or plate by the marking member.

The reproducing apparatus, or which may be called a transferring apparatus, shown in Figs. 1 and 2, is designed and adapted for visibly reproducing substantially the conditions having taken place when the radiographs were made, that is, when the shadows were cast upon the photographic film or plate by the objects or points in the subject in the path of the X-rays.

This apparatus consists primarily of an illuminated box 21, an overhanging support 22, wires 23 and 24, wire positioning means 25, the object indicating members 26 and 27, and the radiograph positioning member 28.

The box 21 may be of any suitable construction, but is preferably provided at its top side with a translucent or ground plate glass 29 which forms a table top for supporting the radiograph and is at least the size of such radiograph. (The term radiograph as I have here used the same, designates the photographic film or plate after the same has been subjected to the X-rays and developed). Within the box 21 is positioned a suitable source of light, such as an electric bulb, or electric bulbs, 30.

The radiograph positioning member 28 consists preferably of a long flat bar which is provided intermediate its ends and at one edge with a flat positioning plate portion 28a with angular and square ends 28b and 28c, respectively, which correspond to the marking portions 7g, 7h and 7i of the marking member 7, and are also similarly shaped, but the ends of the plate portion 28a are provided with upwardly extending pins or lugs 28d which correspond to the dark markings 6a on the radiograph and which are punched out so that the radiographs may be placed over the pins 28d for fixedly positioning the radiographs on the ground glass 29, which in this instance is a working table top. At the opposite ends of the radiograph positioning member 28 are provided downwardly extending positioning pins 28e which are adapted to extend into positioning holes 21a in the top side of and at the opposite sides of the glass plate 29 of the table top. Said holes are provided at spaced intervals for positioning the member 28 inwardly or outwardly relative to the central portion of the table top depending upon the size of radiograph made, said holes and corresponding markings 21b in connection therewith corresponding with the recesses 3a at the opposite sides of the tray 3.

The support 22 consists of an upright member 22a which extends upwardly from the box 21 preferably at one of the sides adjacent the side at which the radiograph positioning member is located, and is provided at its upper end with a horizontal arm 22b which extends over the central portion of the table top. At or near the end of the arm 22a is provided a reel box or casing 31 in which are revolubly mounted a pair of reels 32 and 33 which are preferably mounted on pins 34 and controlled by spiral springs 35. On these reels are wound respectively the wires 23 and 24, mentioned above, and arranged automatically to draw said wires inwardly or upwardly. These wires 23 and 24 extend downwardly through eyes 36 and 37 at the bottom side of the arm 22b. These eyes are positioned a fixed distance apart and a distance equal to the predetermined horizontal shift of the focus or focal axis of the X-ray tube, as indicated by the lines 1' and 1'' in Fig. 3. These eyes are also positioned a distance above the radiographs placed on the table top equal to the distance of the focus of the X-ray tube above the photographic film or plate in the cassette when the film or plate is exposed to the X-rays. It will be here noted that the wires 23 and 24 are very fine spring steel wires so that the same are not readily kinked, but it will be noted that any other type of wire may be used or even fine fabric cords, if desired.

The ends of the wires or cords 23 and 24 extending below the arm 22a are secured to a positioning member 25 which is preferably in the form of a pair of dividers consisting of a pair of arms pivotally connected at one end and provided at their opposite ends with sharp points 25a which are preferably at an angle or at a right angle to the main portions of the arms. The free ends of the wires 23 and 24 extend through eyes located as near as possible to the points at the ends of the arms of the member 25 substantially as shown in Fig. 1. The wires 23 and 24 are adapted to be unreeled by drawing the member 25 downwardly, as shown by dotted lines in Fig. 1.

It will be here noted that when a picture is taken by the X-ray machine with the focus in one position, and the focus is then shifted, a second ray will pass through the same point of any object in the human body or any other subject of which the picture is taken. The crossing of these two rays is the position of the point in space. As long as the object is between the focus of the X-ray tube and the film or plate, there must be two rays through each point and all rays taken from one position must cross those in the other position. Therefore, the wire positioning member 25 is twisted, crossing the wires, thereby locating a point in space The crossing of these wires or the location of the point in space is temporarily located and fixed by the indicating members 26 and 27, or more of such members, if desired. Each of the members 26 and 27 are slidably mounted on supports 41 and are frictionally held in position thereon or therein by springs 42 which may engage one side of the indicating member. The support 41 is mounted on or may form a part of a universal joint which in this instance is supported on an arm 43 extending to the side of the upright 22a intermediate its upper and lower ends. One of these arms 43 is positioned at the opposite sides of the upright 22a for supporting the two indicators 26 and 27. By reason of such mounting of the members 26 and 27, the same may be readily shifted to any position desired over the table top where any of the wires may cross. When not using the indicators 26 and 27 the same may be shifted to upright positions, as indicated by dotted lines in Fig. 1, with their pointed ends in recesses 21c in the table top, thus protecting the points when not in use.

My method of localizing and measuring is carried out as follows:

Assuming that it is desired to measure the diameters of the opening in a pelvic structure of a human being, the patient is laid on the X-ray table 2 with the abdominal portion substantially over the tray 3. A picture is then taken on the film 6 in the position shown in Fig. 5 with the tube on the axis 1'. A second picture is taken on a second film with the patient in the same position and with the X-ray tube shifted to the axis designated by 1''. The films are then developed and, in case of films, the same are perforated at the markings 6a. The films are then superimposed and corresponding points marked on each film by any suitable means such as by ink marks. Accurate superimposition of the films is facilitated by aligning the straight edges at the inner sides of the blank portion 6b even though films may not have been accurately aligned or positioned in the cassette. The films may be shifted back and forth on such straight edges or lines until the desired corresponding points are directly superimposed. The superimposition is only of the corresponding part so that, as nearly as possible, both films may be marked identically. As many points are marked on each film as it is desired to locate and distances between which it is desired to measure. In Fig. 1, the film designated 6', taken with the X-ray tube on the axis 1', is positioned below the other, designated 6''. Some of the corresponding points on each film, shown in Fig. 1, are designated A' and B' on the film 6' and A'' and B'' on the film 6''. These points in this instance are at the opposite sides of the opening in the pelvic structure for measuring the transverse diameter. The films are then superimposed so that the marking 6b, 6c and 6d are superimposed and are placed in such relation over the pins 28d. The wire positioning member 25 is then drawn downwardly and the wires crossed, one point of the member 25 being placed over the point B' and the other over the point B'', placing the wires 23 and 24, respectively, in the dotted line positions C' and C'', representing the X-rays emanating respectively, from the focus of the X-ray tube on the axis 1' and from the focus of the tube on the axis 1'' and passing through the point in space which is to be located, the distance of the point B'' from the point B' being the shift of the shadow of the point in space caused by the shift of the focus of the X-ray tube. The indicating rod 27 is then extended with its point at the crossing of the two wires. Similar procedure is followed by placing the two points of the member 25 over the points A' and A''. The crossing of the wires in this position indicates the point in space or the object in space causing the points A' and A'' on the films. The other indicating member 26 is then directed with its point toward the crossing of the wires in the last described position. The distance between the points of the members 26 and 27 is the actual distance between the two points in space and can be measured directly and accurately. It will be noted that the reference to "points in space" in this instance refers to the portions of the pelvic structure of the human body the distance between which is to be measured.

It will be here understood that the drawings herein are only by way of illustration and are considerably distorted in respect to the pictures on the films and the positions of the corresponding points in space or in the human body.

In order to reduce error in location and measurement to a minimum, I have incorporated in my method a method of checking. The error which might result might be from a variation of the lateral shift of the focus of the tube greater or less than the distance between the eyes 36 and 37 through which the wires extend, or a variation of the target-film distance, that is, the elevation of the focus above the film, or by any other error. For carrying out this method of checking, I place upon the body or subject an iron bar of known length, and radiograph the shadow of such bar, from the same position, on each of the films simultaneously with the radiographing thereon of the object to be localized or measured. The shadows or pictures of the bar are designated D' and D'' on the films 6' and 6'', respectively. The distance between the ends, or the length of the bar is then determined by the method above outlined and compared with the actual length of the bar. If the lengths are identical, it may, for practical purposes, be assumed that no error has been made in the making and marking of the radiographs. Such checking preferably precedes the location and measurement of and between any other points.

Though I have shown and described a particular construction, combination and arrangement of parts and portions of my apparatus, and particular steps of carrying out my method, I do not wish to be limited to the particular construction, combination and arrangement of parts and portions shown and described, nor to the particular steps of my method, but desire to include in the scope of my invention the construction, combination and arrangement of parts and portions, and the method, substantially as set forth in the appended claims.

Having thus described by invention, what I claim as new and desire to secure by Letters Patent is:

1. In an apparatus of the class described, an X-ray tube, a tray positioned in substantial alignment with the focal axis of the tube, a film marker pivotally mounted on and at the upper portion of said tray, a cassette removably mounted in said tray and adapted to be positioned with one edge below said marker, said marker resting directly on the cassette.

2. In an apparatus of the class described, an X-ray tube, a tray adapted to be positioned in substantial alignment with the focal axis of the X-ray tube, an adjustable film marking member adaptable for trays of varying size and provided with pivot means for variously pivotally mounting the marking member on the tray for marking films of various sizes, and a cassette removably positioned in said tray and adapted to be positioned with one edge under and against said marking member.

3. In an apparatus of the class described, a table, a supporting means secured thereto and extending thereover, a pair of wires extending from horizontally spaced apart portions on said supporting means, resilient means normally drawing said wires toward said supporting means, and extensible means having a pair of pointed portions adjustable with respect to each other, the free end of each wire being secured to one of the pointed portions.

4. In an apparatus of the class described, a table, a supporting means secured thereto and extending thereover, a pair of wires extending from horizontally spaced apart portions on said supporting means, resilient means normally drawing said wires toward said supporting means, and a pair of pivotally connected arms having at their free ends pointed portions, each pointed portion being secured to the free end of one of the wires.

5. In an apparatus of the class described, a table, a supporting means secured thereto and extending thereover, a pair of horizontally spaced apart drums mounted on the supporting means, wires secured with one end to each of said drums and wound thereon, spring means in connection with the drums for normally winding the wires thereon, the free ends of the wires being adapted to be drawn downwardly, and extensible means having a pair of pointed portions adjustable with respect to each other, each pointed portion being secured to the free end of one of the wires.

In testimony whereof, I have hereunto set my hand at Los Angeles, California, this 20th day of August, 1928.

CLAYTON R. JOHNSON.